(12) United States Patent
Moreau et al.

(10) Patent No.: US 6,425,939 B1
(45) Date of Patent: Jul. 30, 2002

(54) PROCESS FOR THE PRODUCTION OF HYDROGEN USING A CARBONATED ADSORBENT WITH SELECTED DUBININ PARAMETERS

(75) Inventors: Serge Moreau; Bernd Polster, both of Paris (FR)

(73) Assignee: L'Air Liquide, Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 15 days.

(21) Appl. No.: 09/695,087

(22) Filed: Oct. 25, 2000

(30) Foreign Application Priority Data

Oct. 26, 1999 (FR) .............................. 99 13351

(51) Int. Cl.$^7$ ............................................ B01D 53/047
(52) U.S. Cl. .............................. 95/117; 95/96; 95/118; 95/128; 95/130; 95/132; 95/136; 95/139; 95/140; 95/143; 95/901
(58) Field of Search .......................... 95/116, 117, 128, 95/130, 132, 136, 139, 140, 143–147, 901, 903, 96–106

(56) References Cited

U.S. PATENT DOCUMENTS

| | | | |
|---|---|---|---|
| 3,960,522 A | 6/1976 | Munzner et al. ................ 95/138 |
| 4,790,859 A | * 12/1988 | Marumo et al. ........... 95/903 X |
| 4,933,314 A | * 6/1990 | Marumo et al. ........... 95/903 X |
| 5,118,329 A | * 6/1992 | Kosaka et al. ............ 95/901 X |
| 5,135,548 A | 8/1992 | Golden et al. .................. 55/25 |
| 5,240,474 A | * 8/1993 | Auvil et al. .................... 95/96 |
| 5,411,577 A | * 5/1995 | Moreau et al. ........... 95/903 X |
| 5,447,557 A | 9/1995 | Golden et al. .................. 95/96 |
| 5,710,092 A | * 1/1998 | Baker ....................... 95/901 X |
| 5,827,355 A | * 10/1998 | Wilson et al. ............ 95/903 X |
| 5,912,422 A | * 6/1999 | Bomard et al. ................. 95/96 |
| 5,925,168 A | 7/1999 | Judkins et al. ................. 95/27 |

FOREIGN PATENT DOCUMENTS

| | | |
|---|---|---|
| EP | 0 554 805 | 8/1993 |
| WO | WO 97/45363 | 12/1997 |

* cited by examiner

*Primary Examiner*—Robert H. Spitzer
(74) *Attorney, Agent, or Firm*—Young & Thompson

(57) ABSTRACT

A process for the purification of a gaseous hydrogen flow containing one or more gaseous impurities from the group consisting of carbon monoxide, water vapor, nitrogen, $H_2S$, chlorine, $C_1$–$C_3$ light alcohols, ammonia, carbon dioxide and linear, branched or cyclic hydrocarbons, saturated and unsaturated, $C_1$–$C_8$. The hydrogen flow is placed in contact with a porous carbonated adsorbent having an adsorption limit volume ($W_0$) and an energy parameter of ($E_0$) according to the Dubinin relationship, such that:

$$0.18 \text{ ml.g}^{-1} \leq W_0 \leq 1.50 \text{ ml.g}^{-1}$$

and $$15 \text{ kJ.mole}^{-1} \leq E_0 \leq 45 \text{ kJ.mole}^{-1}.$$

The porous carbonated adsorbent is selected from active carbons. The gas rich in hydrogen is a reforming gas, an electrolysis gas, a gas from ammonia cracking or from alcohol cracking.

20 Claims, 2 Drawing Sheets

PROCESS FOR THE PRODUCTION OF HYDROGEN USING A CARBONATED ADSORBENT WITH SELECTED DUBININ PARAMETERS

FIELD OF THE INVENTION

The present invention relates to the field of the separation of gaseous mixtures by adsorption on a carbonated adsorbent, such as active carbon, with improved properties, in particular a PSA process to produce hydrogen.

BACKGROUND OF THE INVENTION

A PSA unit for the purification of hydrogen contains an adsorbent or a combination of adsorbents which must be capable of selectively retaining the impurities contained in the gas to be treated.

The most common impurities of the gases containing hydrogen are: $N_2$, $CO_2$, $CH_4$, CO, $C_2H_4$, $C_2H_6$, $C_3H_8$, $C_4+$, BTX (benzene-toluene-xylene) compounds, water vapor, mercaptans, $H_2S$, $SO_2$.

These compounds are eliminated from the hydrogen flow by an assembly of adsorbents disposed in series.

Conventionally, alumina or silica gel essentially retain the water vapor; activated carbon is used to retain the heavy hydrocarbons, the $CO_2$ and the water vapor; and zeolite is used to eliminate particularly the impurities $N_2$, CO and $CH_4$.

The proportion of the different adsorbents depends on the composition of the gas to be treated under pressure.

Thus, there are a great number of possible combinations of adsorbents, taking account of the exact nature of the adsorbents and their relative proportions.

The production of high purity hydrogen is of great interest in the industrial field, it being widely used in a number of synthesis processes such as hydrocracking, the production of methanol, the production of oxoalcohols and isomerization processes.

In the prior art, the PSA processes have been very effective for the separation of gaseous mixtures and particularly for the production of pure hydrogen or oxygen from gaseous mixtures contaminated by various impurities.

The PSA processes preferably use the selective adsorption of a given adsorbent for one or several of the contaminating substances in the gaseous mixture to be purified.

Consequently, the production of hydrogen by a PSA process (Pressure Swing Adsorption=Adsorption with Pressure Variation) has been widely studied.

However, most of the papers relating to this subject concern essentially the production cycles and the manner of conducting these cycles, so as to maximize the recovery and/or the purity of the hydrogen product, or else to reduce capital cost.

However, the choice of the adsorbent is delicate: it depends on the one hand on the nature of the mixture to be treated. As a general rule, the adsorbents are selected as a function of their ability to adsorb and desorb a particular compound.

Indeed, the PSA processes involve the use of pressure cycles.

In a first phase, the adsorbent bed ensures the separation of at least one constituent from the mixture by adsorption of this constituent on the bed of adsorbent.

In a second phase, the adsorbent is regenerated by lowering the pressure of the adsorbent beds operating in parallel.

U.S. Pat. No. 4,381,189 and French 2,330,433 illustrate particularly such an operation.

The elimination of the impurities contained in a flow of hydrogen takes place most of the time by means of at least two adsorbent beds disposed in series, namely conventionally an activated carbon bed and a zeolite bed.

In this connection can be cited WO-A-97/45363, which relates to a process for the purification of hydrogen base gaseous mixtures, polluted by various impurities, of which carbon monoxide and at least one other impurity selected from carbon dioxide and straight chain hydrocarbons, branched or cyclic, saturated or unsaturated, $C_{1-8}$. The gas flow to be purified is placed in contact, in an adsorption zone, with a first adsorbent selective to carbon dioxide and $C_{1-8}$ hydrocarbons, and a second adsorption which is a zeolite of the faujasite type exchanged at least 80% with lithium and whose Si/Al ratio is less than 1.5, to eliminate at least carbon dioxide ($CO_2$). According to this document, the improvement afforded by the process is due to the use of a particularly effective zeolite, namely zeolite X exchanged with lithium.

Moreover, U.S. Pat. No. 3,150,942 teaches the use of a zeolite containing sodium or sodium and calcium cations, to purify a hydrogen flow.

Analogously, U.S. Pat. No. 4,477,267 discloses a process for the purification of hydrogen using a zeolite X exchange 70 to 90% with calcium cations and containing moreover an inert binder.

U.S. Pat. No. 4,957,514 discloses a process for the purification of hydrogen using zeolite X exchanged with 60 to 80% barium cations.

Moreover, U.S. Pat. No. 5,489,327 relates to the purification of gaseous hydrogen by contact with a zirconium hydride alloy.

Finally, JP-A-860146024 discloses a PSA process to purify impure gases using a mordenite type zeolite exchanged with lithium, on the production side and a zeolite one on the supply side.

Furthermore, U.S. Pat. Nos. 3,702,525, 3,986,849, 4,077, 779, 4,153,428, 4,696,680, 4,813,980, 4,963,339, 3,430,418, 5,096,470, 5,133,785, 5,234,472, 5,354,346, 5,294,247 and 5,505,764 disclose PSA cycles of operation to produce hydrogen.

Conversely, certain documents emphasize that the adsorbent or the adsorbents used in a PSA process to purify hydrogen have little or no importance.

Thus, the paper Pressure Swing Adsorption, 1994, VCH publishers, D. M. Ruthvens, S. Farooq, K. S. Knaebel, page 238, teaches that "as the selectivity for most of the impurities is high in comparison to that of hydrogen, any adsorbent whatever can be used" to purify hydrogen.

Analogously, according to U.S. Pat. No. 4,299,596, all the conventional adsorbents can be used to purify hydrogen, for example, activated carbon, silica gel, molecular sieves, such as zeolites, carbonated sieves.

Furthermore, U.S. Pat. No. 4,482,361 mentions the possibility of using no matter what suitable adsorbents, such as zeolitic molecular sieves, activated carbon, silica gels, activated alumina or the like.

Analogously, U.S. Pat. No. 4,834,780 teaches that adsorption can be carried out in all cases in which an adsorbent has been selected that is suitable for the separation process in question, for example, activated carbon, silica gel, alumina gel or molecular sieves.

It is thus apparent, in view of the prior art, that those skilled in the art conventionally consider that an improvement of the effectiveness of a PSA production for the production or purification of hydrogen can result only in an improvement of the production cycle or of the zeolitic material used, but that the influence of the adsorbent used is seldom of importance, which is to say that the adsorption has but little influence on the efficiency of the PSA process.

Starting with this, the problem which thus arises is to improve the PSA processes for the purification of hydrogen, which is to say to improve the efficiency of elimination of the impurities contained in a hydrogen flow to be purified.

The present invention seeks to solve this problem, which is to say that the process of the invention permits improving the conventional processes of the PSA type for separation of hydrogen or processes by adsorption with pressure variation.

SUMMARY OF THE INVENTION

The invention thus relates to a process for the purification of a gaseous hydrogen flow containing at least one gaseous impurity selected from the group consisting of carbon monoxide, water vapor, nitrogen, $H_2S$, $SO_2$, carbon dioxide, chlorine, lower $C_{1-3}$ alcohols, ammonia and linear hydrocarbons, branched or cyclic, saturated or unsaturated, $C_{1-8}$, in which the gaseous flow of hydrogen to be purified is contacted with at least one carbonated porous adsorbent characterized by a limit volume of adsorption ($W_0$) and by an energy parameter ($E_0$) according to the Dubinin theory, wherein:

$$0.18 \text{ ml.g}^{-1} \leq W_0 \leq 1.50 \text{ ml.g}^{-1}$$

and $$15 \text{ kJ.mole}^{-1} \leq E_0 \leq 45 \text{ kJ.mole}^{-1}.$$

As the case may be, the process of the invention can comprise one or several of the following characteristics:

$W_0$ is comprised between 0.20 ml.g$^{-1}$ and 1.20 ml.g$^{-1}$, $W_0$ is greater than or equal to 0.25 ml.g$^{-1}$, $W_0$ is greater than or equal to 0.30 ml.g$^{-1}$, $W_0$ is greater than or equal to 0.40 ml.g$^{-1}$, preferably $W_0$ is greater than or equal to 0.50 ml.g$^{-1}$, $E_0$ is comprised between 20 kJ/mole$^{-1}$ and 40 kJ.mole$^{-1}$, $E_0$ is comprised is greater than or equal to 25 kJ.mole$^{-1}$, $E_0$ and $W_0$ are such that:

$$E_0 \leq 47.5 - 12.5 W_0$$

and/or $$E_0 \geq 27.5 - 12.5 \cdot W_0;$$

$E_0$ and $W_0$ are such that:

$$E_0 \leq 42.5 - 12.5 \cdot W_0$$

and/or $$E \geq 30 - 12.5 \cdot W_0;$$

the porous carbonated adsorbent is selected from activated carbon, preferably activated carbon produced from coconut shell, pine bark, peat, lignite, anthracite, polymers, resins or other primarily organic materials.

the hydrogen flow is a synthesis gas or reforming gas, an electrolysis gas, a gas from ammonia cracking or alcohol cracking, such as methanol, preferably a gaseous mixture containing at least 70% hydrogen.

the porous carbonated adsorbent has pores having a size comprised between 0.4 nm and 4 nm, preferably between 0.5 nm and 2 nm.

it is of the PSA type, with one or several adsorbers, preferably several adsorbers. Conventionally, the cycles of a PSA process comprise successively, for each adsorber:

a substantially isobaric production phase at the high pressure of the adsorption cycle, a regeneration phase of the adsorbent comprising at least one co-current decompression step with pressure balancing with another adsorber; a final step of countercurrent depressurization with evacuation of the residual gas; and generally, an elution step at the low pressure of the cycle, the elution gas coming from at least one second co-current decompression step of an adsorber; and a repressurization phase comprising at least one step of pressure balancing with another adsorber and a step of final recompression by means of production gas.

Generally speaking, the cycles can comprise several balancing steps, total or partial, preferably with 1 or 4 balancing steps. The gaseous transfers can take place directly from adsorber to adsorber or by means of one or several gas storages. The recompression steps by balancing and by the production gas can be or not at least partially simultaneous, and can if desired comprise a partial repressurization by the gas feed. Supplemental steps of purging can be introduced, in particular if it is desired to recover and use another fraction of the gas to be treated, different from hydrogen. Moreover, the cycle can also comprise dwell times during which the adsorbers are isolated.

the adsorption pressure is comprised between 5 bars and 70 bars, preferably between 15 bars and 40 bars, the desorption pressure is comprised between 0.1 bar and 10 bars, preferably between 1 and 5 bars, the temperature of the flow of hydrogen to be purified is comprised between −25° C. and +60° C., preferably between +5° C. and +35° C.

the gaseous hydrogen flow is moreover placed in contact with a bed of zeolitic adsorbent, preferably a zeolite X, LSX or A.

the zeolite is preferably of the faujasite type exchanged with at least 70% lithium, a zeolite of the faujasite type whose Si/Al ratio is comprised between 1 and 1.2 and is preferably equal to 1.

the volume ratio of the porous carbonated adsorbent to the zeolite adsorbent is comprised between 10/90 and 90/10, preferably between 50/50 and 80/20.

The invention moreover concerns a porous carbonated adsorbent, characterized by a limit adsorption volume $W_0$ and by an energy parameter $E_0$, according to the Dubinin theory, wherein:

$$0.18 \text{ nml.g}^{-1} \leq W_0 \leq 1.50 \text{ ml.g}^{-1}$$

and $$15 \text{ kJ.mole}^{-1} \leq E_0 \leq 45 \text{ kJ.mole}^{-1},$$

preferably $$E_0 \leq 47.5 - 12.5 \cdot W_0$$

and/or $$E_0 \geq 27.5 - 12.5 \cdot W_0.$$

Thus, the inventors of the present invention have shown that, in a surprising manner, a substantial improvement of the efficiency of a PSA process for the purification of a flow of hydrogen as to the impurities it contains, can be achieved thanks to a judicious choice of the carbonated adsorbent, which is to say of the activated carbon, used in the PSA process, in particular when said activated carbon is used in association with a bed of another adsorbent, preferably a bed of zeolite.

Thus, although it is usual to use particles of activated carbon to eliminate certain of the impurities contained in hydrogen flows, up until now it was not known that the microporous structure of the microporous activated carbon plays an important role in the performance of an adsorption process of the PSA type to purify or separate a flow of gaseous hydrogen.

However, there is a microporous structure which ensures optimum performance in terms of yield of hydrogen recovery.

The structure of the micropores defines the intensity of the adsorptive forces as well as the volume used.

Thus, an activated carbon is a non-crystallized compound conventionally obtained by careful heating and oxidation of a carbonated precursor which can be of vegetable origin (coconut, pine bark), mineral (peat, lignite, anthracite) or else synthetic (polymer).

It is characterized by at least two parameters which are the total porous volume and the intensity of adsorption which depends among other things on the size of the pores.

DETAILED DESCRIPTION OF THE INVENTION

Figure 1:
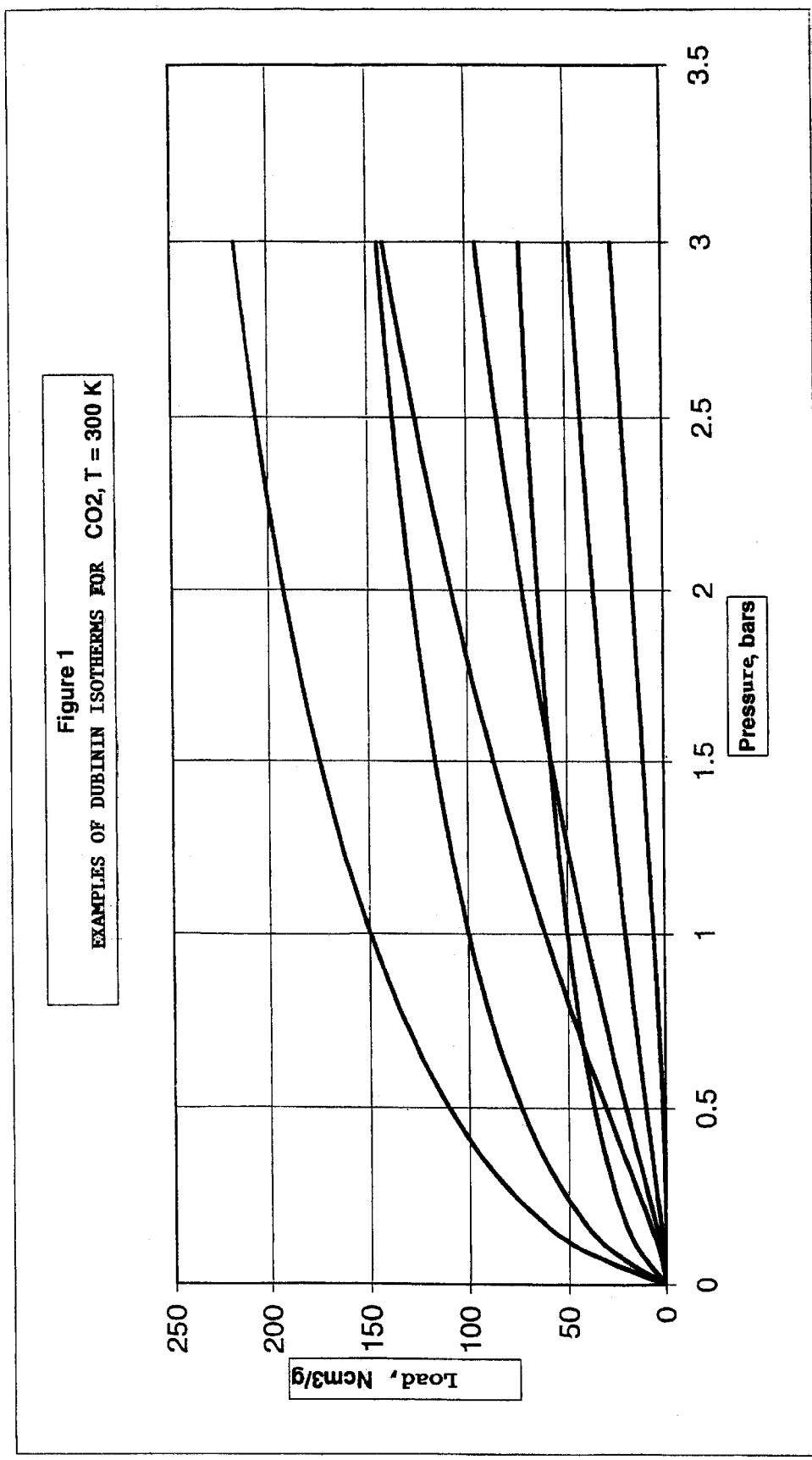
FIG. 1 is a schematic representation of the adsoprtion isotherms of $CO_2$ obtained for different values of the parameters $E_0$ and $W_0$.

A well known method to characterize an activated carbon is the theory of M. M. Dubunin (see for example F. Stoeckli and D. Morel: Chimia 34 No. 12 December 1980 or else M. M. Dubunin, Carbon, Vol. 26, No. 1, p. 97, 1988).

In the Dubinin-Astakhov theory, the volume of the adsorbed phase W (in $cm^3/g$) per gram of microporous adsorbent depends on the fugacity f and the temperature T according to the expression (1):

$$W = W_0 \times \exp\left(-\left(\frac{RT \times \ln\left(\frac{f_s}{f}\right)}{\beta E_o}\right)^n\right) \quad (1)$$

in which:
 $W_0$ is the volume of the accessible micropores (limit volume of adsorption) per gram of adsorbent,
 $f_s$ is the fugacity of the saturating vapor of the adsorbent,
 $E_0$ is the energy characteristic of adsorption of a reference vapor on a given adsorbent in $J.mol^{-1}$ (benzene is selected as a reference),
 n is a parameter depending on the heterogeneity of the adsorbent, comprised in general between 1.5 and 3 (here we will take n=2),
 $\beta$ is the coefficient of affinity of the adsorbate in question (energy parameter depending on the adsorbate), R is the perfect gas constant, which is to say 8.314 $J^{-1}.mol.K$.

From this, the adsorbed quantity W (in $Ncm^3/g$) is given by the following equation (2):

$$W = W_0 \times \exp\left(-\left(\frac{RT \times \ln\left(\frac{f_s}{f}\right)}{\beta E_o}\right)^n\right) \cdot \frac{V_m \cdot d}{M} \quad (2)$$

in which:
 d is the density of the adsorbed phase ($kg.m^{-3}$) under the conditions in question,
 M is the molar mass of the adsorbate (g/mol),
 $V_m$ is the molar volume of the adsorbed phase taken to be equal to 22.414 $l.mol^{-1}$.

The computation of fugacity, of d and $\beta$ is explained hereafter.

When the adsorbent is non-polar, an approximation permitting computing the coefficients of affinity is given by the following equation (3):

$$\beta_j = \frac{(\alpha_p)_j}{(\alpha_p)_*} \quad (3)$$

in which:
 $(\alpha_p)_j$ is the polarizability of the adsorbate j (ini $cm^3$)
 $(\alpha_p)_*$ is the polarizability of a reference adsorbate.

Thus, when benzene ($C_6H_6$) is chosen as the reference adsorbate, the values of the polarizabilities of the compounds being given by the Encyclopédie des Gaz, edited by L'Air Liquide, Scientific Division (Elsevier, 1976)

There is obtained values of coefficients of affinity given in the following Table 1.

TABLE 1

| Coefficients of affinity in the Dubinin model | | |
|---|---|---|
| Molecule | $\alpha_p$ | Coefficient of affinity |
| $C_6H_6$9 | 9.89 | 1 |
| $CO_2$ | 2.594 | 0.26 |
| $CH_4$ | 2.699 | 0.27 |
| $N_2$ | 1.734 | 0.17 |
| CO | 1.926 | 0.19 |
| $H_2$ | 0.8023 | 0.08 |

According to the publication *Physical adsorption of gases at high pressure*; Journal of colloid and interface science, Vol. 79, No. 2, 1981, Wakasugi, Ozawa, Ogino, the following equation (4) permits evaluating the density of the adsorbed phase ($kg.m^{-3}$):

$$d_j = \frac{d_j^*}{\exp(\alpha \cdot (T - T_j^*))} \quad (4)$$

in which:
 $T_j^*$ (in K) is the normal boiling point (P=1 atm) of the adsorbate j,
 T (in K) is the absolute temperature,
 $d_j^*$ ($kg.m^{-3}$) is the density of the adsorbate at $t_j^*$,
 $\alpha$ ($K^{-1}$) is the thermal expansion of the adsorbed phase.

There is given by $\alpha$ the value of the mean thermal expansion of the superheated liquid, namely $\alpha=2.5.10^{-3}$ $K^{-1}$.

From the values tabulated in *Physical adsorption of gases at high pressure,* there are obtained the expressions given in the following Table II.

TABLE II

Expression of the density of the adsorbed phase of $CO_2$, $CH_4$ and $H_2$

| | DENSITY OF THE ADSORBED PHASE (kg · m$^{-3}$) |
|---|---|
| $CO_2$ | $d = \dfrac{1155.755}{\exp(2.5 \cdot 10^{-3} \cdot (T - 223.15))}$ |
| $CH_4$ | $d = \dfrac{422.62}{\exp(2.5 \cdot 10^{-3} \cdot (T - 111.63))}$ |
| $H_2$ | $d = \dfrac{70.973}{\exp(2.5 \cdot 10^{-3} \cdot (T - 20.384))}$ |

The expression of the saturating vapor pressure of an adsorbate as a function of the temperature is given, for a temperature below the critical temperature of the compound, by the expression (5):

$$P_s = \exp\left(-\frac{a}{T} + b\right) \quad (5)$$

In the supercritical case (T>Tc) the following expression (6) is used:

$$P_j = \left(\frac{T}{T_{c,j}}\right)^2 \cdot P_{c,j} \quad (6)$$

The expressions thus determined are gathered below in Table III; the temperatures are expressed in K and the pressures in bars.

TABLE III

Expression of the saturating vapor pressures of $CO_2$, $CH_4$ and $H_2$

| | T < T$_c$ | T ≥ T$_c$ |
|---|---|---|
| $CO_2$ | $P_s = \exp\left(-\dfrac{1987}{T} + 10.827\right)$ | $P_s = \left(\dfrac{T}{304.21}\right)^2 \cdot 73.825$ |
| $CH_4$ | $P_s = \exp\left(-\dfrac{1026.3}{T} + 9.1948\right)$ | $P_s = \left(\dfrac{T}{190.53}\right)^2 \cdot 45.96$ |
| $H_2$ | $P_s = \exp\left(-\dfrac{124.56}{T} + 6.2449\right)$ | $P_s = \left(\dfrac{T}{33.24}\right)^2 \cdot 12.98$ |

Moreover, for a constituent i of a given mixture in vapor phase, the fugacity is given by the following relation (7) for defining the coefficient of fugacity in the vapor phase:

$$f_i^{(v)} = \phi_i \times P \times y_i \quad (7)$$

in which:

$f^{(v)}$: Fugacity in vapor phase, $\phi$: Coefficient of fugacity in vapor phase, P: Pressure, y: Molar fraction.

Conventional thermodynamics gives the following relation (8) for determining the coefficient of fugacity in vapor phase:

$$\ln(\varphi_i) = \frac{1}{RT} \times \int_0^P \left(\frac{\partial V}{\partial n_i} - \frac{RT}{P}\right) dP \quad (8)$$

Research of the coefficient of fugacity thus comes down to a knowledge of $$\frac{\partial V}{\partial n_i}$$

which is given by the equation of the condition of the system in question V=V(P,T,ni).

For a pure gas, the preceding expressions give the following relations (9):

$$\begin{cases} f^{(v)} = \varphi \times P \\ \ln(\varphi) = \dfrac{1}{RT} \times \int_0^P \left(v - \dfrac{RT}{P}\right) dP \\ v = v(P, T) \end{cases} \quad (9)$$

in which v is the molar volume of the pure gas in question.

The selected equation of state is the Peng-Robinson equation which must allow for a fairly wide field of action for the operative conditions (10):

$$P = \frac{RT}{v - b} - \frac{a(T)}{v(v + b) + b(v - b)} \quad (10)$$

with:

$$a(T) = \Omega_a \times \frac{R^2 T^2}{P_c} \times \alpha(T)$$

$$b(T) = \Omega_b \times \frac{RT}{P_c}$$

$\Omega_a$=0.45724

$\Omega_b$=0.07780

$\vec{\sqrt{\alpha}}=1+S\times(1-\sqrt{T_r})$ $S=0.375+1.542\times\omega-0.270\times\omega^2$ in which:

($T_c$, $P_c$) is the critical point.

ω is the acentric factor of the gas in question.

$T_R$ is the reduced temperature (T/T$_c$)

By way of example, the acentric factor of certain gases is given in the following Table IV.

TABLE IV

Values of the acentric factor

| Component | ω |
|---|---|
| $H_2$ | ≈0.02 |
| $CO_2$ | 0.225 |
| $CH_4$ | 0.013 |

The equation of state (11) is a cubic equation, which is to say that it is written as an equation of the third degree in v, parametered by the operative conditions:

$$Pv^3 + (bP - RT)v^2 + (a - 2RTb - 3Pb^2)v + Pb^3 + RTb^2 - ab = 0 \quad (11)$$

Moreover, the expression of the coefficient of fugacity is in the following form (12):

$$\ln(\varphi) = \frac{vP}{RT} - 1 - \ln\left(\frac{P(v-b)}{RT}\right) + \frac{a(T)}{2RTb\sqrt{2}}\ln\left(\left|\frac{v-b(-1+\sqrt{2})}{v+b(1+\sqrt{2})}\right|\right) \quad (12)$$

The operative conditions being selected, equation (11) permits computing the molar volume of the gas and equation (12) the coefficient of fugacity.

From the values tabulated of the molar volume of $H_2$, $CO_2$, and $CH_4$, the coefficients used in the Peng-Robinson equation are readjusted for each component.

TABLE V

Parameters for the Peng-Robinson equation of state

|  | $CH_4$ | $CO_2$ | $H_2$ |
|---|---|---|---|
| $\Omega_a$ | 0.67659 | 0.45724 | 0.45724 |
| $\Omega_b$ | 0.09446 | 0.07780 | 0.07347 |
| $\omega$ | 0.013 | 0.225 | 0.020 |

Thus the adsorption of a known gas, for example $CO_2$, permits obtaining the value of the parameters $W_0$ and $E_0$ which characterized respectively the volume and the intensity of adsorption.

Starting from the preceding formula (1), the inventors of the present invention have shown that certain combinations of the parameters $W_0$ and $E_0$ lead to adsorbents having improved properties for the production of hydrogen by a PSA process, namely:

$$0.18 \text{ ml.g}^{-1} \leq W_0 \leq 1.50 \text{ ml.g}^{-1}$$

$$15 \text{ kJ.mole}^{-1} \leq E_0 \leq 45 \text{ kJ.mole}^{-1}.$$

in particular, when these parameters $W_0$ and $E_0$ fall within the range (see FIG. 2) defined by the following relations:

$$E_0 \leq 47.5 - 12.5 \cdot W_0$$

and/or $$E_0 \leq 27.5 - 12.5 \cdot W_0.$$

The adsorption isotherms of $CO_2$ obtained for different values of the parameters $E_0$ and $W_0$ are schematically shown in the accompanying FIG. 1, in which there will be seen the existence of a wide variability of shape and of respiration as a function of the values of $E_0$ and $W_0$ that are selected.

Generally speaking, to select or determine whether a carbonated adsorbent is comprised or not within the ranges of the parameters $E_0$ and $W_0$ above, it suffices to measure the adsorption isotherm q=f(P), preferably for carbon dioxide, preferably at several temperatures.

W is calculated from q by computing the density of the adsorbate in liquid condition at the adsorption temperatures.

The boiling pressure of the adsorbate is calculated as a function of temperature.

By numerical adjustment of equation (1), the values $W_0$, $E_0$ and if desired n are determined.

More precisely, the principal hypotheses of the computation model of the software for simulation of the process used, are the following:

the model of the adsorber is mono-dimensional and the gaseous distributions, of adsorption and speed, are radially uniform, the wall of the adsorber is at constant temperature, the bed of adsorbent is fixed: the Ledoux criterion is thus always verified.

the thermal model comprises a single temperature, which is to say that of the adsorbent and that of the gas are equal, the adsorption kinetic follows the model of Linear Driving Force, which is to say that the accumulation of weight in grains of adsorbent is proportional to the difference between the concentrations in the macropores and in the intergranular spaces.

the adsorption is modeled by the Langmuir equation (12) for pure bodies:

$$q = \frac{kP}{1+bP} \quad (12)$$

in which k is the Henri constant, and b the inflection coefficient

The co-adsorption is simulated by the Langmuir model (13) generalized:

$$q_k = \frac{q_{s,k} \cdot b_k \cdot p_k}{1 + \sum_j b_j \cdot p_j} \quad (k = 1, 2, \ldots, m) \quad (13)$$

in which:

$q_s$ are the maximum adsorption capacities, b the Langmuir constants, p the partial pressures, q the adsorbed quantities, The base cycle of the PSA process of the invention is thus deconstructed into four principal phases each of which comprises one or several steps:

Phase 1: production phase

Phase 2: depressurization phase (balancing and depressurization for elution)

Phase 3: purge and elution phase

Phase 4: recompression phase (recompression by balancing and final recompression)

The cycle is characterized by an adsorption pressure of 26 bars and a low pressure of 1.6 bars.

The gaseous mixture introduced into the PSA process is comprised of about 70% $H_2$, 26% $CO_2$, and 4% $CH_4$.

The times of the steps are as follows:

Production 1: 60 s

Production 2 (for final recompression): 120 s

Depressurization by balancing: 60 s

Dead time: 30 s

Depressurization for elution: 90 s

Purge: 90 s

Elution: 90 s

Recompression by balancing: 60 s

Final recompression: 120 s

The values k and b of the Langmuir equation necessary for the software for simulation of the cycle are established by adjustment of the values of the Dubinin model according to the method of least squares.

The interesting values are located in the following range:
k=15 at 950 Ncm³/g/b and b=0.022 at 1.5 b⁻¹ for $CO_2$
k=6 at 315 Ncm³/g/b and b=0.014 at 0.50 b⁻¹ for $CH_4$ The characteristics of the isotherm are expressed in terms of inflection coefficient C calculated according to the relationship (14):

$$c = \frac{q(P1)}{q(P2)} * \frac{P2}{P1} \qquad (14)$$

P2 and P1 being the high and low partial pressures for $CO_2$ and $CH_4$ q(P) being the quantity adsorbed at pressure P c takes values between 1.5 and 10.5 for $CO_2$ and between 1.5 and 3.5 for $CH_4$ for high and low pressures of 26 bars and 1.6 bars; the especially interesting values being c between 1.5 and 2.5 for $CH_4$ and c between 2 and 6 for $CO_2$.

The hydrogen output, which is given by the ratio of the quantity of hydrogen produced for each adsorber to the quantity of hydrogen introduced into each adsorber, is the determining parameter in the optimization of the performance of a PSA unit $H_2$.

The results of simulation give the influence of the coefficients $W_0$ and $E_0$ on the hydrogen output.

Figure 2:
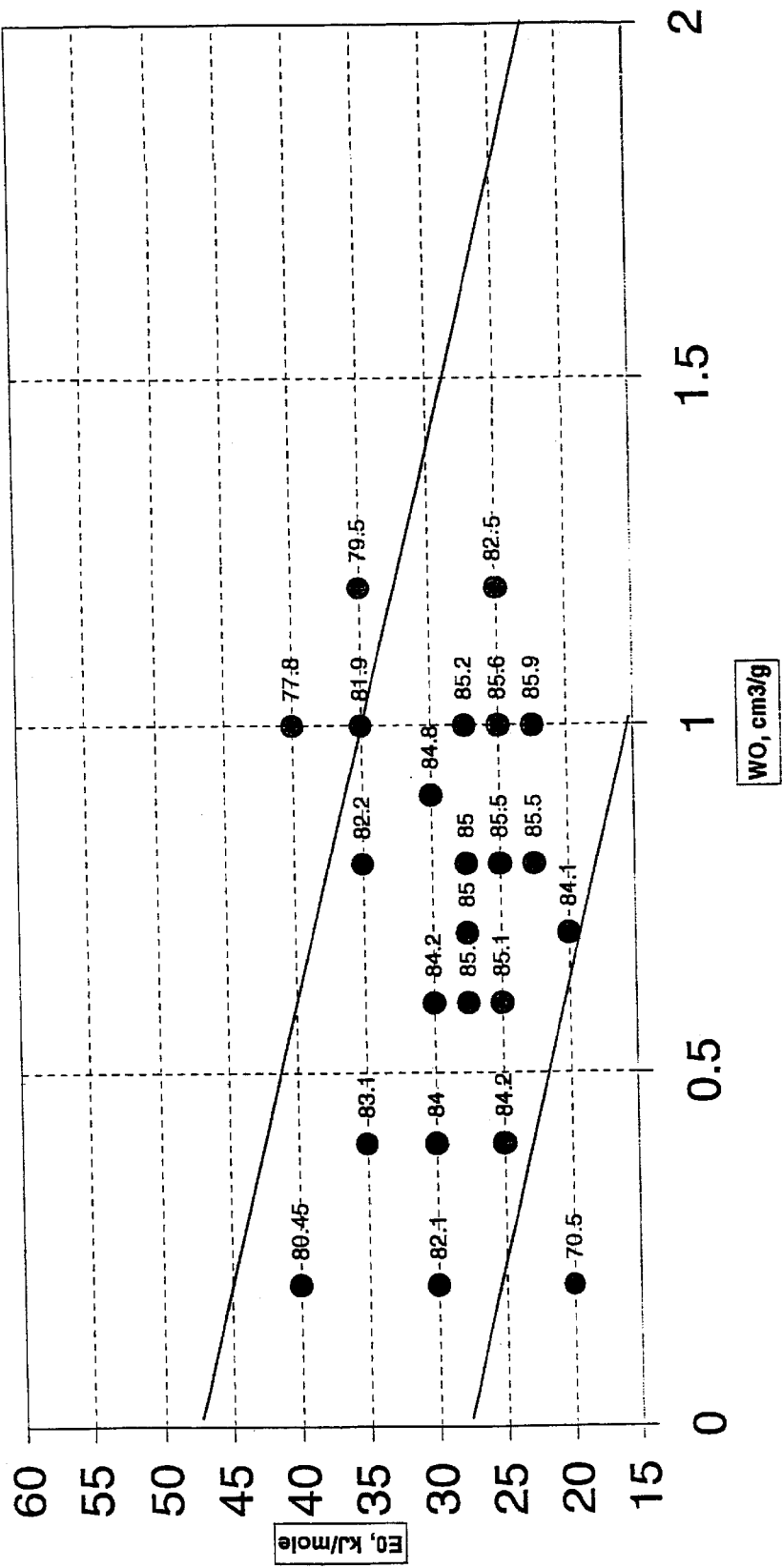
FIG. 2 shows that the optimum values of hydrogen output of the PSA unit having been simulated pass through a region defined by the plane ($W_0$, $E_0$).

Thus, FIG. 2 shows that the optimum values of hydrogen output of the PSA unit having been simulated, pass through a region defined by the plane ($W_0$, $E_0$).

The zone thus defined is comprised between the straight lines of equation $$E_0 = 47.5 - 12.5 \times W_0$$

and $$E_0 = 27.5 - 12.5 \times W_0.$$

From that, the adsorbents having the best efficiency are located in this zone of the plane ($W_0$, $E_0$).

What is claimed is:

1. Process for the purification of a flow of gaseous hydrogen containing at least one gaseous impurity selected from the group consisting of carbon monoxide, water vapor, nitrogen, $H_2S$, carbon dioxide, chlorine, $C_{1-3}$ light alcohols, ammonia and linear, branched or cyclic hydrocarbons, saturated or unsaturated, $C_1$–$C_8$, which process comprises contacting the flow of gaseous hydrogen to be purified with at least one porous carbonated adsorbent having a limit adsorption volume ($W_0$) and an energy parameter ($E_0$) according to the Dubinin relationship wherein:

$$0.18 \text{ ml.g}^{-1} \leq W_0 \leq 1.50 \text{ ml.g}^{-1}$$

and $$15 \text{ kJ.mole}^{-1} \leq E_0 \leq 45 \text{ kJ.mole}^{-1}.$$

2. The process according to claim 1, wherein $W_0$ ranges between 0.20 ml.g⁻¹ and 1.20 ml.g⁻¹.

3. The process according to claim 2, wherein $W_0$ is greater than or equal to 0.25 ml.g⁻¹.

4. The process according to claim 3, wherein $W_0$ is greater than or equal to 0.30 ml.g⁻¹.

5. The process according to claim 1, wherein $E_0$ ranges between 20 kJ.mole⁻¹ and 40 kJ.mole⁻¹.

6. The process according to claim 5, wherein $E_0$ is greater than or equal to 25 kJ.mole⁻¹.

7. The process according to claim 1, wherein $E_0$ and $W_0$ are such that:

$$E_0 \leq 47.5 - 12.5 \cdot W_0$$

and/or $$E_0 \geq 27.5 - 12.5 \cdot W_0.$$

8. The process according to claim 1, wherein the porous carbonated adsorbent is activated charcoal produced from coconut shell, peat, lignite, anthracite, polymers or resins.

9. The process according to claim 1, wherein the hydrogen flow is a synthesis gas, a reforming gas, an electrolysis gas, a gas from ammonia cracking, a gas from alcohol cracking, or a gaseous mixture containing at least 70% hydrogen.

10. The process according to claim 1, wherein the porous carbonated adsorbent has pores having a size ranging between 0.4 nm and 4 nm.

11. The process according to claim 10, wherein the pores range between 0.5 nm and 2 nm.

12. The process according to claim 1, wherein the process is a PSA process.

13. The process according to claim 1, wherein the process is carried out at an adsorption pressure ranging between 5 and 70 bars, and/or a desorption pressure between 0.1 and 10 bars.

14. The process according to claim 13, wherein the adsorption pressure ranges between 15 and 40 bars, and the desorption pressure between 1 and 5 bars.

15. The process according to claim 1, wherein the hydrogen flow to be purified has a temperature ranging between −25° C. and +60° C.

16. The process according to claim 15, wherein the temperature ranges between +5° C. and +35° C.

17. The process according to claim 1, wherein the gaseous hydrogen flow is further contacted with a bed of a zeolitic adsorbent.

18. The process according to claim 17, wherein the zeolitic adsorbent is faujasite zeolite exchanged at least 70% with lithium, and having a Si/Al ratio ranging between 1 and 1.2.

19. The process according to claim 17, wherein the volume ratio of the porous carbonated adsorbent to the zeolitic adsorbent ranges between 10/90 and 90/10.

20. The process according to claim 19, wherein the volume ratio ranges between 50/50 and 80/20.

* * * * *